(12) United States Patent
Ross

(10) Patent No.: US 6,659,467 B2
(45) Date of Patent: Dec. 9, 2003

(54) TELESCOPING HOUSING

(75) Inventor: Thomas Ross, Geneva, IL (US)

(73) Assignee: B.M.T.L., Inc., Rockford, IL (US)

( * ) Notice: Subject to any disclaimer, the term of this patent is extended or adjusted under 35 U.S.C. 154(b) by 97 days.

(21) Appl. No.: 10/000,286

(22) Filed: Nov. 2, 2001

(65) Prior Publication Data

US 2003/0085524 A1 May 8, 2003

(51) Int. Cl.[7] .............................. F41J 3/00; A63F 13/08
(52) U.S. Cl. ...................... 273/407; 273/371; 273/406; 463/46
(58) Field of Search ................................. 273/371–377, 273/406, 407, 398, 400–402; 463/46; 40/490, 491, 601; 312/198

(56) References Cited

U.S. PATENT DOCUMENTS

| 631,175 | A | * | 8/1899 | Parnall | 273/406 |
|---|---|---|---|---|---|
| 2,884,252 | A | * | 4/1959 | Thompson | 473/477 |
| 3,825,261 | A | | 7/1974 | Zapos | |
| 4,535,988 | A | * | 8/1985 | Foley | 473/477 |
| 4,766,422 | A | * | 8/1988 | Wolters et al. | 312/198 |
| 4,881,744 | A | * | 11/1989 | Hansen | 273/376 |
| 5,004,247 | A | * | 4/1991 | Menke | 273/376 |
| 5,211,405 | A | * | 5/1993 | Shelton et al. | 273/407 |
| 5,292,135 | A | * | 3/1994 | Menke | 273/376 |
| 6,322,461 | B1 | * | 11/2001 | Walsh | 473/422 |
| 6,325,376 | B1 | * | 12/2001 | Elliott et al. | 273/406 |

* cited by examiner

Primary Examiner—Mark S. Graham
(74) Attorney, Agent, or Firm—Cook, Alex, McFarron, Manzo, Cummings & Mehler, Ltd.

(57) ABSTRACT

A multiple part telescoping game housing is disclosed having an upper housing with a game site thereon and a lower housing. The upper housing is movable relative to the lower housing to permit easy positioning and secure locking of the upper housing in a game play position in which the upper housing extends vertically upward from the lower housing, and a retracted storage or transport position in which the upper housing is positioned substantially within the lower housing.

29 Claims, 2 Drawing Sheets

TELESCOPING HOUSING

BACKGROUND AND SUMMARY OF THE INVENTION

The present invention is directed to a game housing for a game site which may be displayed for one or more players to play the game and, more particularly, to a multiple part telescoping game housing for an electronic dart game.

Various games, such as electronic dart games, have been known in which the various components, including the game play site, the electronic scoring and display circuitry and the display panel itself are positioned in or on a housing. In the case of an electronic dart game, the housing is typically taller than it is wide with the dart board displayed on a front panel at approximately the eye level of the players. A score display panel is also typically located on the housing usually above the dart board so that it may be readily viewed by the players. Control panels, such as for selection of the kind of dart game to be played, are typically located on a lower portion of the housing around the waist level of the players for easy manipulation and access of selector buttons, etc. In addition, the score processing circuitry is typically located in the housing where it is protected.

These prior game housings can be rather unwieldy to store or ship due to their relatively tall but narrow and thin dimensions. Because of this, they may have a tendency to tip during transport and they consume a rather large volume of space in both storage and transport.

The game housing of the present invention overcomes these several disadvantages of the prior game housings and also permits the enclosure of the dart game board within a portion of the housing during storage and shipment to protect the game board against damage.

In one principal aspect of the present invention, a multiple part game housing comprises an upper housing with a game site thereon for one or more players to play the game; and a lower housing. The upper housing is movable relative to the lower housing between a first position in which the upper housing extends substantially vertically from and out of the lower housing to permit the players to play the game, and a second position in which the upper housing is substantially contained within the lower housing. A lock locks the upper housing in at least one of the positions.

In still another principal aspect of the present invention, a guide is provided for guiding the movement of the upper housing in its movement between the positions.

In still another principal aspect of the present invention, the guide includes at least one elongate stationary guide surface extending vertically on one of the housings.

In still another principal aspect of the present invention, the lower housing has a rear wall and the elongate stationary guide surface is on the rear wall inside the lower housing and bears against a wall of the upper housing opposite the game site when the upper housing is moving between the positions.

In still another principal aspect of the present invention, the stationary guide surface has at least one end, and the locking means is movable in a substantially horizontal direction to engage that end to lock the upper housing in at least one of the positions.

In still another principal aspect of the present invention, the stationary guide surface has an upper and a lower end, and the locking means is movable in a substantially horizontal direction to engage said upper end to lock the upper housing in the first position, and to engage the lower end to lock the upper housing in the second position.

In still another principal aspect of the present invention, the locking means comprises a substantially flat plate carried on the upper housing, the flat plate extending over a substantial portion of the width of the upper housing, and movable substantially horizontally between locking and unlocking positions.

In still another principal aspect of the present invention, first urging means is included for urging the flat plate into at least one of the locking positions, and second urging means is also included which is operable from outside of the lower housing for urging the flat plate into the unlocking position at least when the upper housing is locked in its second position.

In still another principal aspect of the present invention, the guide comprises at least one roller which contacts a side of the upper housing with the game site thereon when the upper housing is moving between the first and second positions.

In still another principal aspect of the present invention, the locking means includes at least one adjustable pin which draws the upper housing toward the elongate stationary guide surface when the upper housing is in the first position.

In still another principal aspect of the present invention, the game is an electronic dart game, and the game site is a dart board.

These and other objects, features and advantages of the present invention will be more clearly understood through a consideration of the following detailed description.

BRIEF DESCRIPTION OF THE DRAWINGS

In the course of this description reference will be frequently be made to the attached drawings in which.

DESCRIPTION OF THE PREFERRED EMBODIMENTS

Figures 1, 2:
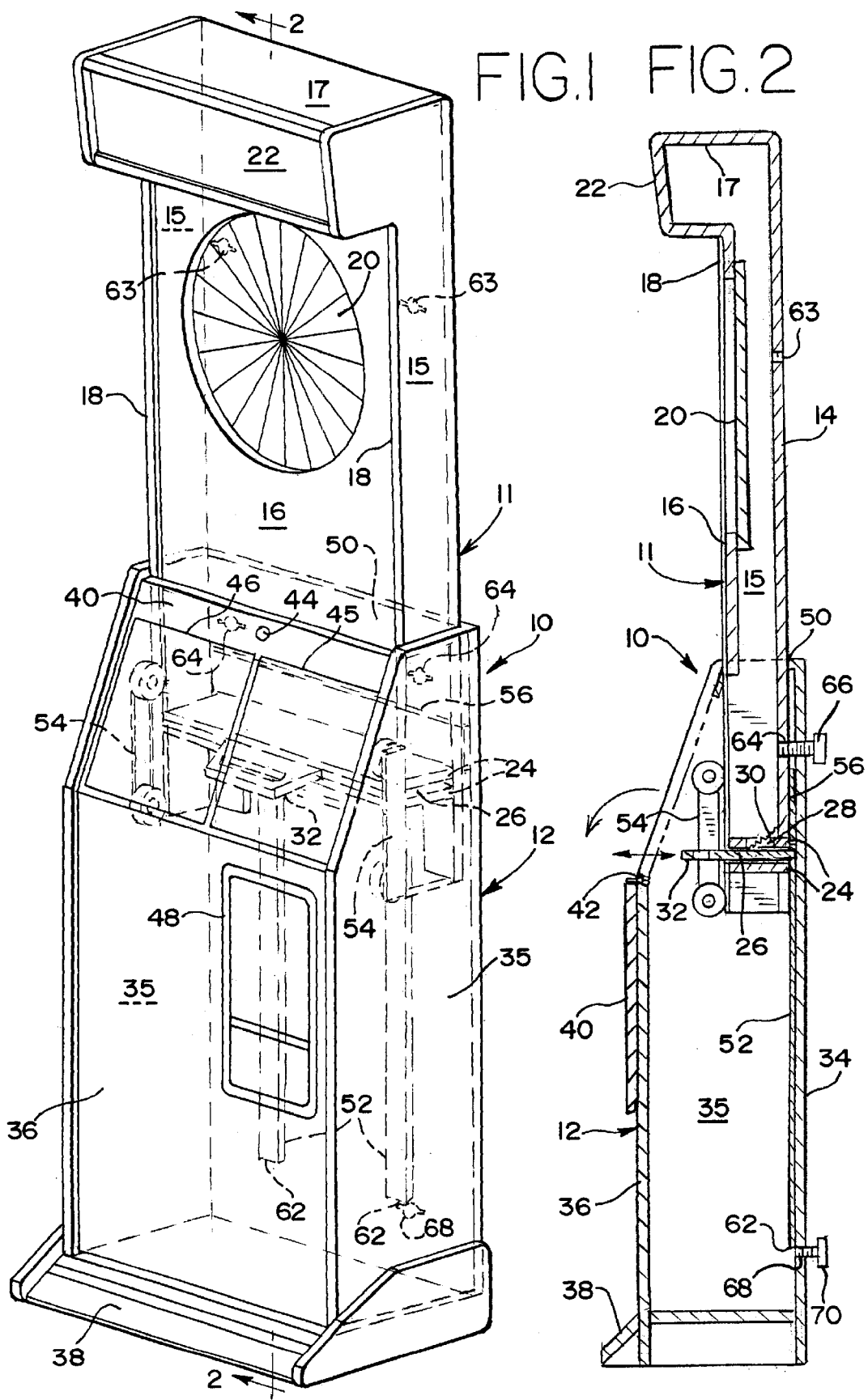
FIG. 1 is a perspective view of a preferred embodiment of game housing constructed in accordance with principles of the present invention and in which the upper portion of the housing is telescoped out of the lower portion of the housing in a game play position.
FIG. 2 is a cross-sectioned side elevation view of the game housing as viewed substantially along lines 2—2 of FIG. 1.

A preferred embodiment of multiple-part game housing generally 10 is shown in the drawings. The housing 10 includes an upper housing 11 and a lower housing 12, with the upper housing 11 being movable relative to the lower housing 12 to permit it to be telescoped into and out of the lower housing 12 as seen in the drawings.

The upper housing preferably comprises an enclosure having a rear wall 14, a pair of spaced side walls 15, a front wall 16, and a top wall 17. The front vertical edges 18 of the side walls 15 preferably extend slightly beyond the front wall 16 for a reason to be explained below.

The game site for the play of the game by the players, such as a dart board 20, is displayed on the front wall 16 of the upper housing 11. A display panel 22 may be also presented at the top of the upper housing 11 for various electronic displays, such as the game score, etc.

The upper housing 11 also includes a pair of transversely extending plates 24 which extend between and are fixed to the side walls 15 toward the bottom of the upper housing 11. The plates 24 are spaced from each other to receive a sliding locking plate 26 which preferably also extends transversely between the sidewalls 15 but is not fixed to the side walls as are plates 24. The upper plate 24 also contains one or more slots 28 which are spaced from each other over its length. Each slot 28 accommodates a spring 30 which is attached at one end to the rear wall 14 of the upper housing, and at the other end to the sliding plate 26. As depicted by the double-headed arrow in FIGS. 2 and 4, the sliding locking plate 26 is movable back and forth in the direction of the arrow. It is urged to the right, as viewed in FIGS. 2 and 4, by the force of the springs 30 into its locking position as will be described in more detail below. The slidable plate 26 also preferably includes a handle 32 to facilitate its manual movement to the left to the unlocking position against the force of springs 30.

The lower housing 12 also includes a rear wall 34, a pair of spaced side walls 35 and a front wall 36. Base 38 supports both the lower housing 12 together with the upper housing 11 in an upright position during storage and transport, as well during play of the game. An inclined access panel 40 is also preferably mounted by hinges 42 at the top of the front wall 36 so that the access panel 40 may be opened as seen in FIG. 2 to provide access to the sliding locking plate 26, as well as any electronic circuitry that may be contained in the lower part of the upper housing 11 or in the upper part of the lower housing 12. The access panel 40 may also be provided with a key operated lock 44 to lock the access panel in its closed position during use. The front face of the access panel 40 also preferably provides an area for a control panel 45 and/or instruction panel 46 for use in the selection of game to be played, etc. The details of such panels 45 and/or 46 are not shown because they do not form a part of the invention. The front wall 36 of the lower housing 12 may also contain a coin operating or bill or card reader mechanism 48 if desired.

Figure 3:
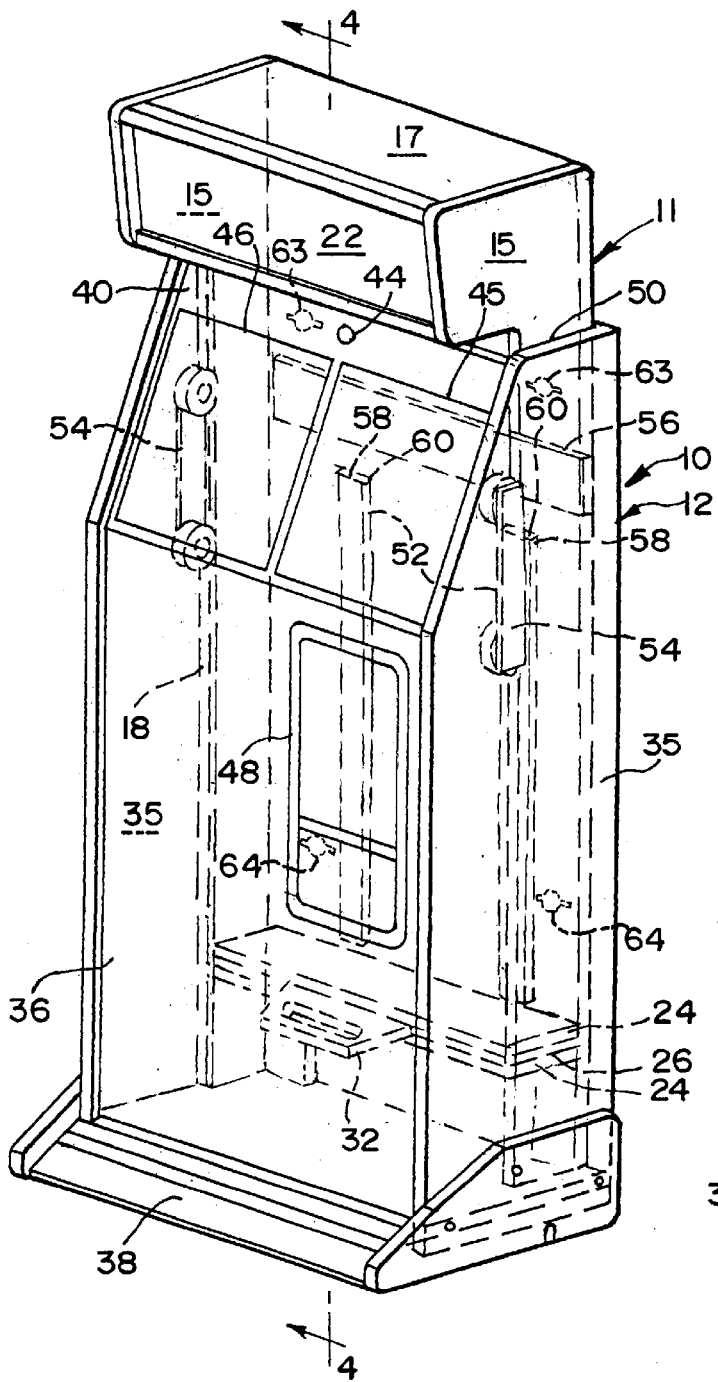
FIG. 3 is a perspective view of the preferred embodiment of game housing as shown in FIG. 1, but in which the upper portion of the housing has been lowered into the lower portion of the housing in a storage and/or transport position.
Figure 4:
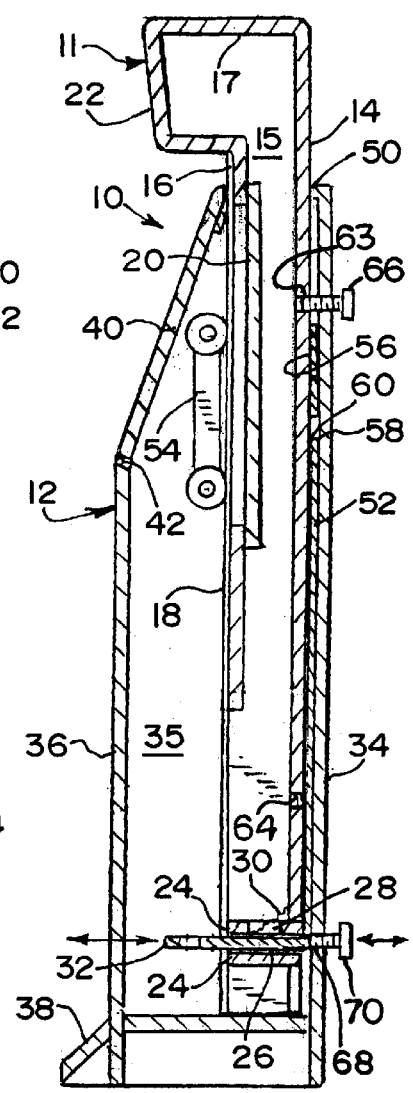
FIG. 4 is a cross-sectioned side elevation view of the game housing as viewed substantially along line 4—4 of FIG. 3.

The rear wall 34, side walls 35 and top of the access panel 40 are spaced from each other so as to define an opening 50 in the top of the lower housing 12 which is large enough to receive the upper housing 11 into the lower housing 12 in a telescoping fashion as shown in the drawings. The upper housing 11 is capable of being moved relative to the lower housing 12 between a first position in which it extends vertically from the lower housing 12 as seen in FIGS. 1 and 2 to the game play position, and a second position in which it is substantially contained within the lower housing 12 for storage and transport as shown in FIGS. 3 and 4. In order to facilitate movement between these two positions, one or more elongate vertically extending guide rails 52 are preferably mounted to the interior face of the rear wall 34 of the lower housing 12. In addition, sets of rollers 54 are also mounted to the side walls 35 of the lower housing 12 so that the rollers bear against the edges 18 of the side walls 15 of the upper housing 11 which edges 18 extend slightly beyond the front wall 16. Thus, the edges 18 effectively also act as guide rails during movement of the upper housing 11 between its two positions.

A horizontal rail 56 also preferably extends transversely across the inner face of the rear wall 34 of the lower housing 12. The horizontal rail 56 is spaced from the upper ends 58 of the guide rails 52, as best seen in FIGS. 3 and 4, to provide a gap 60 to receive the sliding locking plate 26 to lock the upper housing in its game play, extended position as seen in FIGS. 1 and 2. Conversely, the lower ends 62 of the guide rail 52 are spaced from the bottom of the lower housing 12 by a distance such that when the upper housing 11 is fully lowered into the lower housing 12 as seen in FIGS. 3 and 4 so as to rest against the bottom of the lower housing, the sliding locking plate 26 will be positioned just beneath the lower end 62 to lock the upper housing in its lowered position and prevent its upward movement.

In addition, a pair of horizontally spaced tee-nuts 63 is located toward the top of the rear wall 14 of the upper housing 11, and another pair of horizontally spaced tee-nuts 64 is located toward the bottom of the rear wall of the upper housing, as best seen in FIGS. 1 and 3. A pair of clamping knobs 66 extend through spaced openings in the upper end of the rear wall 34 of the lower housing 12. The clamping knobs 66 include a threaded pin so that they can be adjustably threaded into and out of the lower tee-nuts 64 when the upper housing has been positioned in its desired extended position, and into the upper tee-nuts 63 when the upper housing is in its lowered position. Thus, the clamping knobs 66 will pull the upper housing 11 backward against the guide rails 52 when threaded into the tee-nuts 63 or 64 to securely lock the upper housing 11 in its desired extended or lowered position.

A tee-nut 68 us also positioned in an opening in the rear wall 34 of the lower housing 12 adjacent the lower ends 62 of the guide rails 52. A pushing knob 70, which may be substantially identical to the clamping knob 66 previously described, is threaded into the tee-nut 68, as shown in FIGS. 2 and 4. When the threaded pin of the pushing knob 70 is threaded in the outward direction, the sliding locking plate 26 can move to the right so as to lock beneath the lower ends 62 of the guide rails 52, as seen in FIG. 4. However, because access to the handle 32 of the sliding locking plate 26 is not generally possible through the lower part of the lower housing 12 to permit manual movement of the locking plate to the unlocking position, when the pushing knob 70 is threaded to the left and into its tee-nut 68 from the outside of the housing, it will bias the sliding locking plate 26 to the left so that the plate unlocks from beneath the lower ends 62 of the guide rails 52 to permit the upper housing 14 to be moved upwardly from the position shown in FIG. 4 to the extended game play position shown in FIG. 2.

Although it is believed from the foregoing description that the operation of the multiple part telescoping game housing of the present invention will be evident to those skilled in the art, a brief description of the operation follows.

Initially it will be assumed that the upper housing is in its extended game play position, as shown in FIGS. 1 and 2. In this position the sliding locking plate 26 will be urged by spring 30 to the right so that the right edge of the plate 26 is positioned in the gap 60 between the upper ends 58 of the guide rails 52 and the lower edge of the horizontal rail 56, and against the inner face of the rear wall 34 of the lower housing 12, as seen in FIG. 2. With this positioning of the sliding locking plate 26, movement of the upper housing 11 further upward will be prevented by the horizontal rail 56, and movement downward will be prevented by the upper ends 58 of the guide rails 52. In addition, the clamping knobs 66 are threaded inwardly into the tee-nuts 64 in the bottom of the rear wall 14 of the upper housing 11 to pull the upper housing backward so that the rear wall firmly engages the guide rails 52 and the horizontal rail 56 to lock the upper housing in place.

If it is desired to lower the upper housing 11 into the upper housing 12, the clamping knobs 66 are threaded out of the tee-nuts 64 to free the upper housing 11 for vertical movement. The inclined access panel 40 is also opened to its open position as shown in FIG. 2 to permit access to the sliding locking plate 26. The sliding locking plate 26 is then manually pulled to the left, as viewed in FIG. 2, by the handle 32 against the force of spring 30 to disengage the right edge of the sliding locking plate from the gap 60.

Now that the upper housing 11 has been unlocked, it may be simply moved downwardly into the lower housing 12 until the bottom of the upper housing rests upon the bottom of the lower housing, as viewed in FIG. 4. As the upper housing is moved downwardly, it will be guided by the vertical guide rails 52, the horizontal guide plate 56, and the roller sets 54.

Once the upper housing 11 has been positioned in its retracted position, as seen in FIGS. 3 and 4, the sliding locking plate 26 will pass beneath the lower ends 62 of the guide rails. Thus, the sliding locking plate 26 will move to the right as viewed in FIG. 4 by the force of spring 30 to lock the locking plate beneath the lower ends 62 of the guide rails 52. At this time the clamping knobs 66 may also be threaded inwardly again and into the upper tee-nuts 63 to supplement the locking of the locking of the upper housing in the lower position, as seen in FIG. 4.

If it is desired to unlock the upper housing 11 from its retracted position as seen in FIGS. 3 and 4, and to move it to its extended position, the pushing knob 70 is threaded inwardly into the tee-nut 68 and lower housing to move the sliding locking plate 26 to the left so that it will clear the lower ends 62 of the guide rails 52.

As the upper housing 11 is moved upwardly, it will again be guided in its movement by guide rails 52, the horizontal guide plate 56, and roller sets 54 until it reaches the elevation shown in FIGS. 1 and 2. At this time the sliding locking plate 26 will again move to the right under the force of spring 30 to enter the gap 60 and lock the upper housing 11 into its extended game play position, as shown in FIGS. 1 and 2. Locking is further assisted by the inward threading of the clamping knobs 66 into the lower tee-nuts 64.

It will be appreciated from the foregoing description that the multiple part telescoping game housing of the present invention stabilizes the housing and substantially reduces the consumption of space during storage and shipment, and permits the enclosure of the game site to protect it against damage and unauthorized play.

It will be also understood that the preferred embodiment of the present invention which has been described is merely illustrative of the principles of the present invention. Modifications may be made by those skilled in the art without departing from the true spirit and scope of the invention.

I claim:

1. A multiple part game housing, comprising:
    an upper housing with a dart game site thereon for one or more players to play the game;
    a lower housing, said upper housing being movable relative to said lower housing between a first position in which said upper housing extends substantially vertically from and out of said lower housing to permit the players to play the game, and a second position in which said upper housing is substantially contained within said lower housing; and
    a lock to lock said upper housing in at least one of said positions.

2. The multiple part game housing of claim 1, including a guide for guiding the movement of said upper housing in its movement between said positions.

3. The multiple part game housing of claim 2, wherein said guide includes at least one elongate stationary guide surface extending vertically on one of said housings.

4. The multiple part game housing of claim 3, wherein said lower housing has a rear wall and said elongate stationary guide surface is on the rear wall inside the lower housing and bears against a wall of said upper housing opposite said game site when said upper housing is moving between said positions.

5. The multiple part game housing claim 4, wherein said stationary guide surface has at least one end, and said lock is movable in a substantially horizontal direction to engage said end to lock said upper housing in at least one of said positions.

6. The multiple part game housing of claim 3, wherein said stationary guide surface has an upper and a lower end, and said lock is movable in a substantially horizontal direction to engage said upper end to lock said upper housing in said first position, and to engage said lower end to lock said upper housing in said second position.

7. The multiple part game housing of claim 6, wherein said lock comprises a substantially flat plate carried on said upper housing, said flat plate extending over a substantial portion of the width of said upper housing and movable substantially horizontally between locking and unlocking positions.

8. The multiple part game housing of claim 7, including first urging means for urging said flat plate into at least one of said locking positions, and second urging means operable from outside of said lower housing for urging said flat plate into said unlocking position at least when said upper housing is locked in its second position.

9. The multiple part game housing of claim 2, wherein said lock comprises a substantially flat plate carried on said upper housing, said flat plate extending over a substantial portion of the width of said upper housing and movable substantially horizontally between locking and unlocking positions.

10. The multiple part game housing of claim 9, including first urging means for urging said flat plate into at least one of said locking positions, and second urging means operable from outside of said lower housing for urging said flat plate into said unlocking position at least when said upper housing is locked in its second position.

11. The multiple part game housing of claim 3, wherein said guide comprises at least one roller which contacts a side of the upper housing with said game site thereon when said upper housing is moving between said first and second positions.

12. The multiple part game housing of claim 11, wherein said lock includes at least one adjustable pin which draws said upper housing toward said elongate stationary guide surface when said upper housing is in said first position.

13. The multiple part game housing of claim 12, wherein said adjustable pin also draws said upper housing toward said elongate stationary guide surface when said upper housing is in said second position.

14. The multiple part game housing of claim 1, wherein said game is an electronic dart game, and said game site is a dart board.

15. The multiple part game housing of claim 5, wherein said stationary guide surface has an upper and a lower end, and said lock is movable in a substantially horizontal direction to engage said upper end to lock said upper housing in said first position, and to engage said lower end to lock said upper housing in said second position; said lock comprising a substantially flat plate carried on said upper housing, said flat plate extending over a substantial portion of the width of said upper housing and movable substantially horizontally between locking and unlocking positions; first urging means for urging said flat plate into at least one of said locking positions, second urging means operable from outside of said lower housing for urging said flat plate into said unlocking position at least when said upper housing is locked in its second position; said guide also comprises at least one roller which contacts a side of the upper housing with said game site when said upper housing is moving between said first and second positions; and said lock also includes at least one adjustable pin which draws said upper housing toward said elongate stationary guide surface when said upper housing is in said first position.

16. The multiple part game housing of claim 15, wherein said game is an electronic dart game, and said game site is a dart board.

17. A multiple part game housing, comprising:
- an upper housing with a game site thereon for one or more players to play the game;
- a lower housing, said upper housing being movable relative to said lower housing between a first position in which said upper housing extends substantially vertically from and out of said lower housing to permit the players to play the game, and a second position in which said upper housing is substantially contained within said lower housing;
- a guide for guiding the movement of said upper housing in its movement between said positions; and
- a lock to lock said upper housing in at least one of said positions, said lock comprising a substantially flat plate carried on said upper housing, said flat plate extending over a substantial portion of the width of said upper housing and movable substantially horizontally between locking and unlocking positions.

18. The multiple part game housing of claim 17, wherein said guide includes at least one elongate stationary guide surface extending vertically on one of said housings.

19. The multiple part game housing of claim 18, wherein said lower housing has a rear wall and said elongate stationary guide surface is on the rear wall inside the lower housing and bears against a wall of said upper housing opposite said game site when said upper housing is moving between said positions.

20. The multiple part game housing claim 19, wherein said stationary guide surface has at least one end, and said lock is movable in a substantially horizontal direction to engage said end to lock said upper housing in at least one of said positions.

21. The multiple part game housing claim 18, wherein said stationary guide surface has an upper and a lower end, and said lock is movable in a substantially horizontal direction to engage said upper end to lock said upper housing in said first position, and to engage said lower end to lock said upper housing in said second position.

22. The multiple part game housing of claim 21, including first urging means for urging said flat plate into at least one of said locking positions, and second urging means operable from outside of said lower housing for urging said flat plate into said unlocking position at least when said upper housing is locked in its second position.

23. The multiple part game housing of claim 17, including first urging means for urging said flat plate into at least one of said locking positions, and second urging means operable from outside of said lower housing for urging said flat plate into said unlocking position at least when said upper housing is locked in its second position.

24. The multiple part game housing of claim 18, wherein said guide comprises at least one roller which contacts a side of the upper housing with said game site thereon when said upper housing is moving between said first and second positions.

25. The multiple part game housing of claim 24, wherein said lock includes at least one adjustable pin which draws said upper housing toward said elongate stationary guide surface when said upper housing is in said first position.

26. The multiple part game housing of claim 25, wherein said adjustable pin also draws said upper housing toward said elongate stationary guide surface when said upper housing is in said second position.

27. The multiple part game housing of claim 17, wherein said game is an electronic dart game, and said game site is a dart board.

28. The multiple part game housing claim 20, wherein said stationary guide surface has an upper and a lower end, and said lock is movable in a substantially horizontal direction to engage said upper end to lock said upper housing in said first position, and to engage said lower end to lock said upper housing in said second position; first urging means for urging said flat plate into at least one of said locking positions, second urging means operable from outside of said lower housing for urging said flat plate into said unlocking position at least when said upper housing is locked in its second position; said guide also comprises at least one roller which contacts a side of the upper housing with said game site when said upper housing is moving between said first and second positions; and said lock also includes at least one adjustable pin which draws said upper housing toward said elongate stationary guide surface when said upper housing is in said first position.

29. The multiple part game housing of claim 28, wherein said game is an electronic dart game, and said game site is a dart board.

* * * * *